(12) United States Patent
Steinmann et al.

(10) Patent No.: US 8,904,948 B2
(45) Date of Patent: Dec. 9, 2014

(54) FAULT TOLERANT VESSEL STABILISER CONTROL SYSTEM

(75) Inventors: Paul Douglas Steinmann, Fremantle (AU); Tristan Perez, Valentine (AU)

(73) Assignee: Veem Ltd., Canning Vale Western Australia (AU)

( * ) Notice: Subject to any disclaimer, the term of this patent is extended or adjusted under 35 U.S.C. 154(b) by 181 days.

(21) Appl. No.: 13/579,517

(22) PCT Filed: Feb. 17, 2011

(86) PCT No.: PCT/AU2011/000169

§ 371 (c)(1),
(2), (4) Date: Oct. 19, 2012

(87) PCT Pub. No.: WO2011/100797

PCT Pub. Date: Aug. 25, 2011

(65) Prior Publication Data

US 2013/0036958 A1    Feb. 14, 2013

(30) Foreign Application Priority Data

Feb. 17, 2010    (AU) ................................ 2010900643

(51) Int. Cl.
*B63B 39/04* (2006.01)
*G01C 21/18* (2006.01)

(52) U.S. Cl.
CPC ................ *B63B 39/04* (2013.01); *G01C 21/18* (2013.01)
USPC ...................................................... 114/122

(58) Field of Classification Search
USPC ............ 114/122, 274; 74/5.4, 5.47, 5.1, 5.12, 74/5.34, 5.7; 482/44
See application file for complete search history.

(56) References Cited

U.S. PATENT DOCUMENTS 769,493 A    9/1904   Schlick
(Continued)

FOREIGN PATENT DOCUMENTS

WO    2009/009074    1/2009
WO    2009/049371    4/2009

OTHER PUBLICATIONS

ISR for related PCT/AU2011/000169 mailed on Mar. 23, 2012.
IPRP for related PCT/AU2011/000169 issued on Aug. 21, 2012.
(Continued)

*Primary Examiner* — Lars A Olson
(74) *Attorney, Agent, or Firm* — Ladas & Parry, LLP (57) ABSTRACT

A vessel stabilizer control system (12) includes a sensor fault detection means (16) which senses the availability of sensing signals from a gyrostabilizer precession motion sensor (10) and a vessel roll motion sensor (14). The control system (12) controls the action of a gyro-actuator (8) which is mechanically coupled to a gyrostabilizer (4). The benefit of employing fault sensing of the sensors providing the process control variables is that the sensed number of available process control variables (or sensors) can be used to activate a tiered system of control modes. Each tiered control mode is designed to utilize the available process control variables to ensure safe and effective operation of the gyrostabilizer (4) that is tolerant of sensor faults and loss of power supply. A control mode selector (18) is provided for selecting the appropriate control mode based on the number of available process control variables.

24 Claims, 6 Drawing Sheets

(56) References Cited

U.S. PATENT DOCUMENTS

| | | | |
|---|---|---|---|
| 2,790,119 A * | 4/1957 | Konet et al. | 318/649 |
| 3,280,642 A * | 10/1966 | Noxon | 74/5.4 |
| 7,181,987 B2 | 2/2007 | Hamady | |
| 7,451,667 B2 | 11/2008 | Hamady | |
| 7,854,177 B2 | 12/2010 | Hamady | |
| 2004/0244513 A1 | 12/2004 | Adams et al. | |
| 2005/0274210 A1* | 12/2005 | Adams et al. | 74/5.4 |
| 2013/0036959 A1 | 2/2013 | Steinmann et al. | |

OTHER PUBLICATIONS

Office Action mailed on Apr. 24, 2014 from related U.S. Appl. No. 13/579,520.

PCT International Preliminary Report on Patentability (Chapter I) dated Aug. 21, 2012 from related PCT/AU2011/000168.

PCT Written Opinion of the International Search Authority dated Mar. 22, 2011 from related PCT/AU2011/000168.

PCT Search Report dated Mar. 22, 2011 from related PCT/AU2011/000168.

* cited by examiner

FAULT TOLERANT VESSEL STABILISER CONTROL SYSTEM

CROSS-REFERENCE TO RELATED APPLICATIONS

This application is the U.S. National Stage of International Patent Application No. PCT/AU2011/000169 filed on Feb. 17, 2011, which claims priority to Australian Patent Application No. 2010900643 filed on Feb. 17, 2010, the disclosures of which are hereby incorporated by reference in their entireties.

FIELD OF THE INVENTION

The present invention relates to a control system and method for stabilising marine vessel motion induced by excitation wave forces that produce roll motion and relates particularly, though not exclusively, to such a system and method which includes a gyrostabiliser and employs several control modes to provide fault tolerant control.

BACKGROUND TO THE INVENTION

When a gyrostabiliser is used in a marine vessel to attenuate rolling motion, the rolling motion of the vessel induces flywheel precession that in turn produces a torque that opposes the rolling motion. This means that the induced flywheel precession is always in an appropriate phase to attenuate rolling motion (if the precession does not exceed 90°). Depending on the resistance to precession caused by the mechanical arrangement, when the rolling rate of rotation (roll rate) exceeds a certain level, the induced precession torque will cause the flywheel to precess through more than 90° (over-precess). This causes instability in the roll resisting torque produced by the flywheel as it momentarily becomes zero. If the resistance to precession is great enough to prevent induced over-precession during peak input events, the stabilising effect during more common events will be severely limited. It is therefore desirable to provide a gyrostabiliser control system to either vary the resistance to precession, or actively control the flywheel precession motion of the gyroscope.

There are many known gyrostabiliser control systems, from the manual precession axis brake actuated by a lever to active control of the precession angle in dependence typically on sensed vessel roll motion and gyroscope precession motion. The manual precession axis brake, first proposed by Schlick in 1904 and described by White in 1907, required manual intervention to prevent over-precession in wave environments outside a small range of design conditions.

The American company Sperry then developed a system that addressed the problem of the Schlick gyroscope by using an electric motor controlled by switches and a small gyroscope to control the precession of the main gyroscope. In this system the rate of precession was proportional to the roll rate of the vessel. Although the performance of these, prior art systems was remarkable in some wave environments, (up to 95% roll reduction), the precession control systems were not able to adapt to varying wave conditions, so the performance was limited by simplistic precession torque controls. With the invention of lighter and cheaper fin stabilisers, which work well when a ship is at speed allowing hydrodynamic lift to be produced by the fins, interest in gyrostabilisers waned.

Gyrostabilisers have particular benefits for applications where the vessel has zero or low forward speed, when hydrodynamics based systems have little or no effect. Several applications including, but not limited to, patrol boats, luxury motor yachts, offshore floating production systems and offshore work boats all have significant operational roles at low or zero speed. These applications are driving renewed interest in revisiting gyrostabilisers for controlling wave induced ship rolling motion.

As a result, there have been proposed more complex control systems for gyrostabilisers to provide improved vessel motion attenuation performance over a wide range of operating conditions. For example, in WO 2009/009074, Rubenstein and Akers disclose a control strategy using attitude and angular rate sensors for both the vessel and the gyrostabiliser to produce a feed forward component. This is used along with a feedback component, a mode input (indicative of current events such as launching, parked or underway at various speeds) and an anticipation of the effect of the intended control (when applied to the gyrostabiliser and/or other vessel stabilising devices) to produce a resource allocation vector for the gyro and any other control means.

By actively controlling the precession of the gyrostabiliser flywheel, safe and effective performance across a wide range of operating conditions can be achieved. Active control of the precession requires sensor feedback for use as process control variable(s). If a process control variable becomes unavailable to the control system due to sensor error, loss of system power or other failure, the active control system will cease to operate. For actively driven gyrostabilisers, this will result in immediate loss of the stabilising influence of the gyrostabiliser, which risks the safe and/or comfortable operation of the vessel.

With the provision of increasing numbers of sensors to permit more complex gyrostabiliser control algorithms that are more responsive to changing sea states and vessel motion, the risk of one or more sensors failing is increased.

The present invention was developed with a view to providing a gyrostabiliser control system and method that is fault tolerant, reducing the severity of the risk of one or more sensors failing. However it will be appreciated that the control system and method of the invention also has application to other types of vessel stabilisers, such as hydrodynamic stabilisers. Examples of hydrodynamic stabilisers include, fins, rudders, T-foils, interceptors, flume tanks or transom flaps and examples of other types of stabilising device include moveable ballast systems.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a stabiliser control method for stabilising marine vessel motion induced by excitation wave forces, the method comprising the steps of:

detecting the availability or otherwise of a precession motion sensor signal and the availability or otherwise of a vessel roll motion sensor signal;

selecting a first control mode when both the sensor signals are available;

selecting a second control mode when only one of the sensor signals is available; and, selecting a third control mode when both sensor signals are unavailable whereby, in use, the most appropriate control mode in the circumstances is selected to provide control of the stabiliser that is tolerant to the unavailability of the precession motion sensor signal and/or the vessel roll motion sensor signal.

Typically the precession motion sensor signal is obtained by sensing the precession of a gyrostabiliser which is being employed in a vessel stabilising system to stabilise the vessel. Alternatively, or additionally, in some situations the precession motion sensor signal may be obtained, for example, by sensing the precession motion of a gyroscopic sensor provided for sensing vessel motion. The vessel stabilising system may or may not employ a gyrostabiliser, however in the preferred embodiment the vessel stabilising system employs at least one gyrostabiliser.

The first control mode may involve active control of the precession of the gyrostabiliser using both sensor signals and/or derivatives of the sensor signals as process control variables by either driving the precession or actively resisting the roll induced free precession of the flywheel to produce a desired precession motion. The first control mode may include Proportional Integral Derivative (PID) controllers, fuzzy logic controllers, neural network control, robust controllers; model predictive control methods, adaptive control methods including the Automatic Gain Control (AGC) controller of the Applicant's co-pending International Application No PCT/AU2011/000168 details of which are incorporated herein by reference, or combinations of these control approaches. The first control mode may respond to a force allocation method which senses the actions of other stabilising devices and adjusts the gyrostabiliser controller accordingly to provide an optimized system of stabilising devices. The first mode of control may require or allow for operator input. The first control mode may use the measured precession axis and vessel roll axis data directly as process control variables or it may include a predictive element which provides estimates of future states of these signals which are then used as inputs to the various possible first control mode methods of control.

The second control mode may involve active control of the precession of the gyrostabiliser using either the gyrostabiliser precession motion sensor signal or the vessel roll motion sensor signal and/or derivatives of the signal as a process control variable by either driving the precession or actively damping the roll induced free precession of the flywheel to produce a desired precession motion. Alternatively the second control mode may include the step of: calculating appropriate precession axis driving or damping control commands using either predictive or reactive control methods with or without adaptive capability, based on the gyrostabiliser precession motion sensor signal and/or its calculated derivatives. Preferably the second control mode includes the steps of: estimating the precession motion from the vessel roll motion sensor signal; and, calculating appropriate precession axis driving or damping control commands using either predictive or reactive control methods with or without adaptive capability, based on the estimated precession motion and/or its calculated derivatives. Advantageously the second control mode employs an adaptive control method including the steps of: generating a control signal aimed at increasing the precession of the gyrostabiliser flywheel until it is estimated, based on a process control variable derived from the gyrostabiliser precession axis motion, that the gyrostabiliser precession axis motion will exceed a predefined limit; and, applying a precession control torque about the gyrostabiliser precession axis responsive to the control signal whereby, in use, active adaptive control of the vessel motion can be achieved based only on the process control variable derived from the gyrostabiliser precession axis motion.

Additionally or alternatively, when the gyrostabiliser precession motion sensor signal is unavailable, the vessel roll motion sensor signal and/or its derivatives may be used to generate an estimated precession signal corresponding to an estimate of the gyrostabiliser precession axis motion, the estimated precession signal being substituted for the gyrostabiliser precession motion sensor signal in the second control mode.

Preferably the third control mode provides passive control of the precession of the gyrostabiliser by applying a conservative preset level of braking or damping to the precession axis designed to limit precession angles to within a predefined limit in up to a maximum design sea state over the expected range of operating conditions. Optionally the preset level of braking or damping applied to the precession axis is manually adjustable.

The vessel stabilising system may include an additional vessel stabilising device such as an additional gyrostabiliser (to permit control of both roll and pitch for example), a hydrodynamic stabiliser and/or another type of stabilising device. Examples of hydrodynamic stabilisers include fins, rudders, T-foils, interceptors, flume tanks or transom flaps, and examples of other types of stabilising device include moveable ballast systems. The first control mode may include the step of controlling the additional stabilising device simultaneously with the control of the gyrostabiliser and/or as allocated by a force allocation system. The second control mode may include the step of controlling the additional stabilising device. The third control mode may include the step of placing the additional stabilising device in a default or disabled state.

The control method may include the further step of sensing the availability of the gyrostabiliser and of any additional stabilising devices and modifying a force allocation to suit the loss of availability, or a reduction in performance of one or more of the stabilising devices.

According to another aspect of the present invention there is provided a stabiliser control system for stabilising marine vessel motion induced by excitation wave forces, the system comprising:

fault detecting means for detecting the availability or otherwise of a precession motion sensor signal and the availability or otherwise of a vessel roll motion sensor signal;

control mode selecting means for selecting a first control mode when both the sensor signals are available, selecting a second control mode when only one of the sensor signals is available, and selecting a third control mode when both sensor signals are unavailable; and, stabilising control command generating means for generating a stabilising control command in accordance with the selected control mode whereby, in use, the most appropriate control mode in the circumstances is selected to provide vessel stabilisation that is tolerant to the unavailability of the precession motion sensor signal and/or the vessel roll motion sensor signal.

Typically the precession motion sensor signal is obtained by sensing the precession of a gyrostabiliser which is being employed in a vessel stabilising system to stabilise the vessel. Alternatively, or additionally, in some situations the precession motion sensor signal may be obtained, for example, by sensing the precession motion of a gyroscopic sensor provided for sensing vessel motion. The vessel stabilising system may or may not employ a gyrostabiliser, however in the preferred embodiment the vessel stabilising system employs at least one gyrostabiliser.

The stabilising control command generated in the first control mode may provide active control of the precession of the gyrostabiliser using both sensor signals and/or derivatives of the sensor signals as process control variables by either driving the precession or actively resisting the roll induced free precession of the flywheel to produce a desired precession motion.

Likewise the stabilising control command generated in the second control mode may provide active control of the precession of the gyrostabiliser using either the gyrostabiliser precession motion sensor signal or the vessel roll motion sensor signal and/or derivatives of the signal as a process control variable by either driving the precession or actively damping the roll induced free precession of the flywheel to produce a desired precession motion.

Typically the stabilising control command generating means comprises: means for calculating appropriate precession axis driving or damping control commands in the second control mode using either predictive or reactive control methods with or without adaptive capability, based on the gyrostabiliser precession motion sensor signal and/or its calculated derivatives.

Optionally the stabilising control command generating means comprises: means for estimating the precession motion from the vessel roll motion sensor signal in the second control mode; and, means for calculating appropriate precession axis driving or damping control commands using either predictive or reactive control methods with or without adaptive capability, based on the estimated precession motion and/or its calculated derivatives.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

Throughout this specification the term "vessel" refers to a marine floating platform, typically a boat, yacht, barge, ship or submarine, which is subject to oscillating motion due to induced excitation forces that produce roll motion. The term "roll motion" refers to the rolling motion of the vessel including any or all derivatives thereof, but more broadly refers to any oscillating motion of the vessel that it is desired to be attenuated.

BRIEF DESCRIPTION OF THE DRAWINGS

The nature of the invention will be better understood from the following detailed description of preferred embodiments of the vessel stabiliser control system and method, given by way of example only, with reference to the accompanying drawings, in which.

DETAILED DESCRIPTION OF PREFERRED EMBODIMENTS

Figure 1:
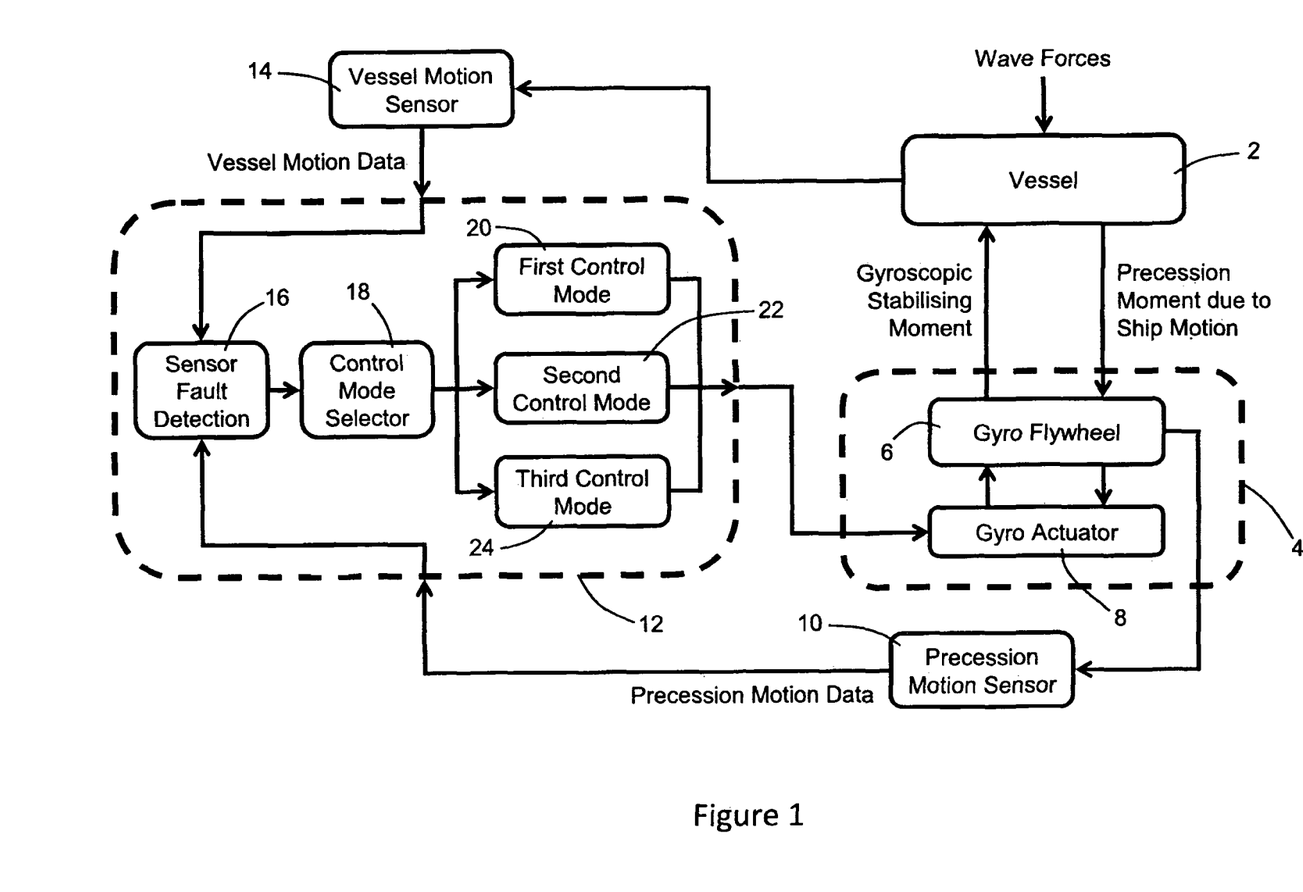
FIG. 1 is a schematic view of a preferred embodiment of a vessel stabiliser control system according to the present invention.

FIG. 1 illustrates the architecture of a preferred embodiment of a vessel stabiliser control system 12 according to the present invention for stabilising the roll motion of a marine vessel 2 induced by excitation wave forces. A gyrostabiliser 4 is employed in the vessel stabilising system for stabilising the vessel 2, and is oriented such that roll motion of the vessel 2 induces precession motion of the gyrostabiliser 4 about its precession axis. The gyrostabiliser 4 is mechanically coupled to a gyro-actuator 8, such that motion of the gyrostabiliser 4 results in displacement of the gyro-actuator 8. The roll motion of the vessel 2 is transferred to a flywheel 6 of the gyrostabiliser 4, and the precession action of the flywheel 6 produces a gyroscopic stabilising moment that counteracts the moment induced by the wave forces. Although this embodiment is described for a roll motion attenuation application, the invention is equally applicable to the attenuation of pitch motions.

Gyroscopic flywheels have two degrees of freedom: spin and precession. By conservation of angular momentum due to spin and the location of the vessel hull, the flywheel 6 produces a gyroscopic roll moment proportional to the product of the flywheel's spin angular momentum (inertia×angular velocity) and precession rate. The spin rate is generally constant, but this can also be controlled. Hence the larger the precession rate of the flywheel, the larger the gyroscopic stabilising moment produced on the vessel. However, the precession rate and angle must be limited to ensure maximum mechanical loads and other physical constraints are not exceeded, and to prevent excessive precession angles where the effective stabilising torque is reduced but non-useful torques in other planes become significant. The limiting of the precession is achieved by the gyro-actuator 8 which is typically either a hydraulic, electrical or a combination system that provides a braking and/or driving torque about the precession axis.

The action of the gyro-actuator 8 is regulated or controlled by the vessel stabiliser control system 12. A vessel roll motion sensor 14 provides roll angle measurements for the vessel stabiliser control system 12. Typically a gyro precession motion sensor 10 provides precession angle measurements of the gyrostabiliser 4 for the vessel stabiliser control system 12. The vessel stabiliser control system 12 processes the process control variables provided by the sensors 10 and 14 and produces appropriate control commands to the gyro-actuator 8.

The vessel stabilising system may or may not employ a gyrostabiliser, although in the illustrated embodiment the stabilising system employs at least one gyrostabiliser 4. In some situations the vessel stabilising system may employ a hydrodynamic stabiliser and no gyrostabiliser. In that case, the precession motion sensor signal may be obtained, for example, by sensing the precession motion of a gyroscopic sensor provided for sensing vessel motion.

The vessel stabiliser control system 12 includes a sensor fault detection means 16 which senses the availability of sensing signals from the gyrostabiliser precession motion sensor 10 and the vessel roll motion sensor 14. The benefit of employing fault sensing of the sensors providing the process control variables, is that the sensed number of available process control variables (or sensors) can be used to activate a tiered system of control modes. Each tiered control mode is designed to utilise the available process control variables to ensure safe and effective operation of the gyrostabiliser 4 that is tolerant of sensor faults and loss of power supply. A control mode selector 18 is provided for selecting the appropriate control mode based on the number of available process control variables.

If the sensor fault detection means 16 determines that both the precession and roll signals from the sensors 10 and 14 respectively are available, the control mode selector 18 will select a first control mode 20. Control mode 20 is the most complex (or top tier) of the three selectable control modes, requiring input of both vessel and gyrostabiliser motion data to provide a high level of performance from the gyrostabiliser 4.

If the sensor fault detection means 16 determines that a signal from only one of the precession and roll sensors 10 and 14 is available, the control mode selector 18 will select a second control mode 22 which is the middle tier of the three selectable control modes. The second control mode requires an input data of only one of either vessel or gyrostabiliser motion to provide a good level of performance from the gyrostabiliser 4.

When the sensor fault detection means 16 determines that the signals from both the precession and roll sensors 10 and 14 are unavailable, the control mode selector 18 will select the third control mode 24. The third control mode 24 is the lowest tier of the three selectable control modes, providing passive control of the damping of the precession motion without requiring sensor signals to provide a limited level of performance from the gyrostabiliser 4.

The sensor fault detection means 16, the control mode selection 18 and the various stabilising control command generation means (including the first, second and third control modes 20, 22, and 24) are each typically code integrated into a single controller.

Figure 2:
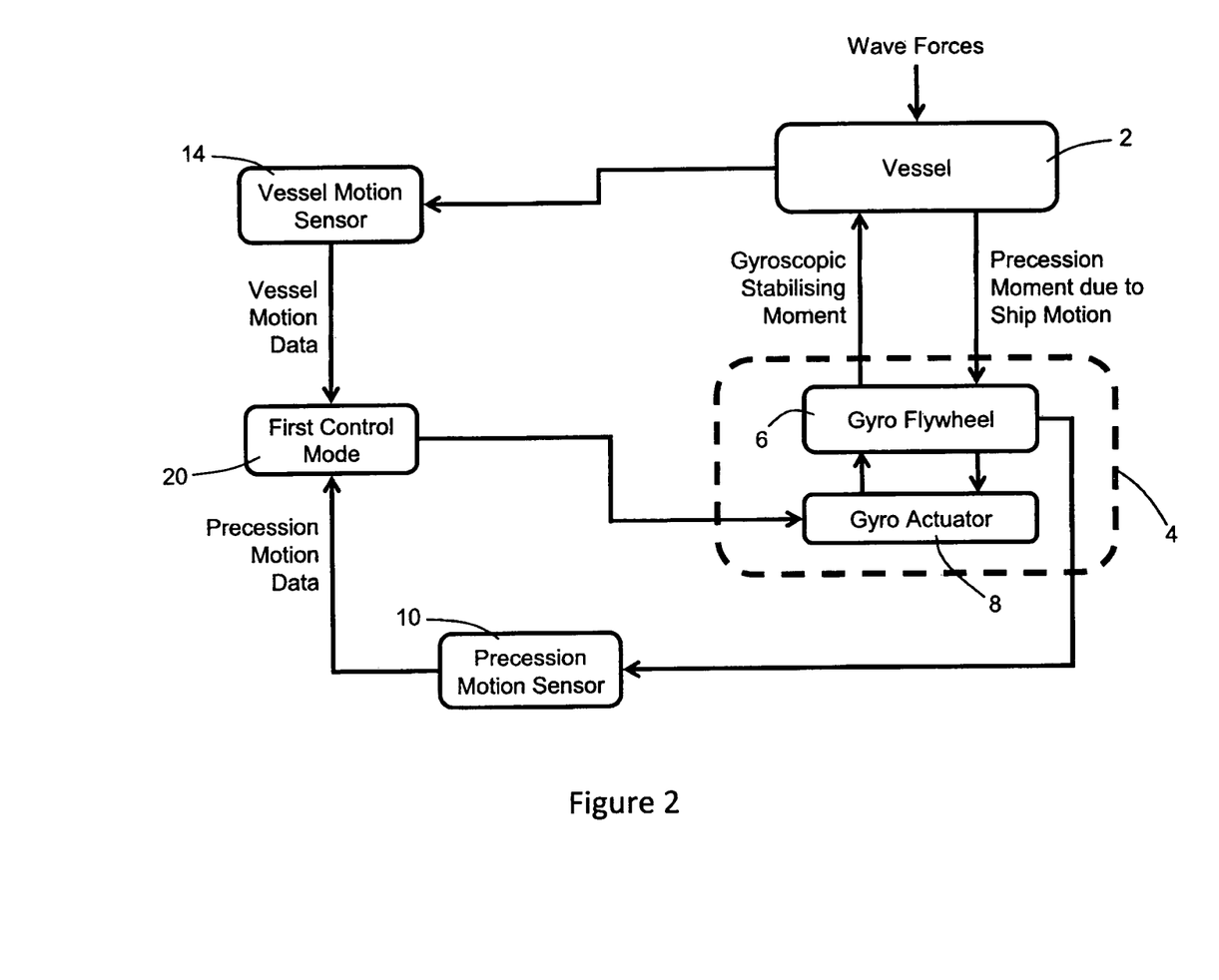
FIG. 2 is a schematic view of the control system of FIG. 1 when operating in a first control mode.

FIG. 2 illustrates the first control mode 20 of the vessel stabiliser control system 12 where the control system receives both vessel roll motion and gyrostabiliser precession motion signals from the respective sensors 14 and 10. The first control mode 20 typically provides active control of the gyro-actuator 8, either driving the precession or actively resisting (damping) the roll induced free precession of the flywheel 6 to produce a desired precession motion. If the vessel motion sensor 14 provides a roll angle signal and the gyrostabiliser precession motion sensor 10 provides a precession angle signal, the control system 12 can differentiate these angle signals to generate rate and acceleration if required. Alternatively, or for redundancy additionally, rate and/or acceleration sensors can be included in the vessel motion sensor 14 and/or precession motion sensor 10. As acceleration can be integrated to give rate and angle. (albeit with generally less accuracy) any angle, rate or acceleration signal can be provided by the vessel and precession motion sensors, with the derivatives being calculated by the control system.

The first control mode may include Proportional Integral Derivative (PID) controllers, fuzzy logic controllers, neural network control, robust controllers, model predictive control methods, adaptive control methods including the Automatic Gain Control (AGC) controller of Applicant's co-pending International Application No PCT/AU2011/000168, or a combination of these and/or other control approaches.

As other stabilising devices such as fins, rudders, T-foils, interceptors, flume tanks, transom flaps and moveable ballast can also be provided in addition to the gyrostabiliser 4, the first control mode 20 may respond to a force allocation method which senses the actions of, other stabilising devices and adjusts the gyrostabiliser control accordingly to provide an optimised system of stabilising devices. The first control mode may require or allow for operator input, such as for example, how aggressive or conservative the precession axis control should be, what type of control algorithm should be used (particularly if different algorithms excel in different sea states), whether the active control is driving or only braking the precession axis motion, what level of power to operate at, or even what the predicted sea state is at a particular time. The first control mode 20 may be one of several alternate first control modes, each requiring both vessel roll and gyrostabiliser precession motion signals. The first control mode 20 may use the measured precession axis and vessel roll axis data directly as process control variables, or it may include a predictive element which provides estimates of future states of these signals which are then used as inputs to the various possible methods of control in the first control mode 20.

Figure 3:
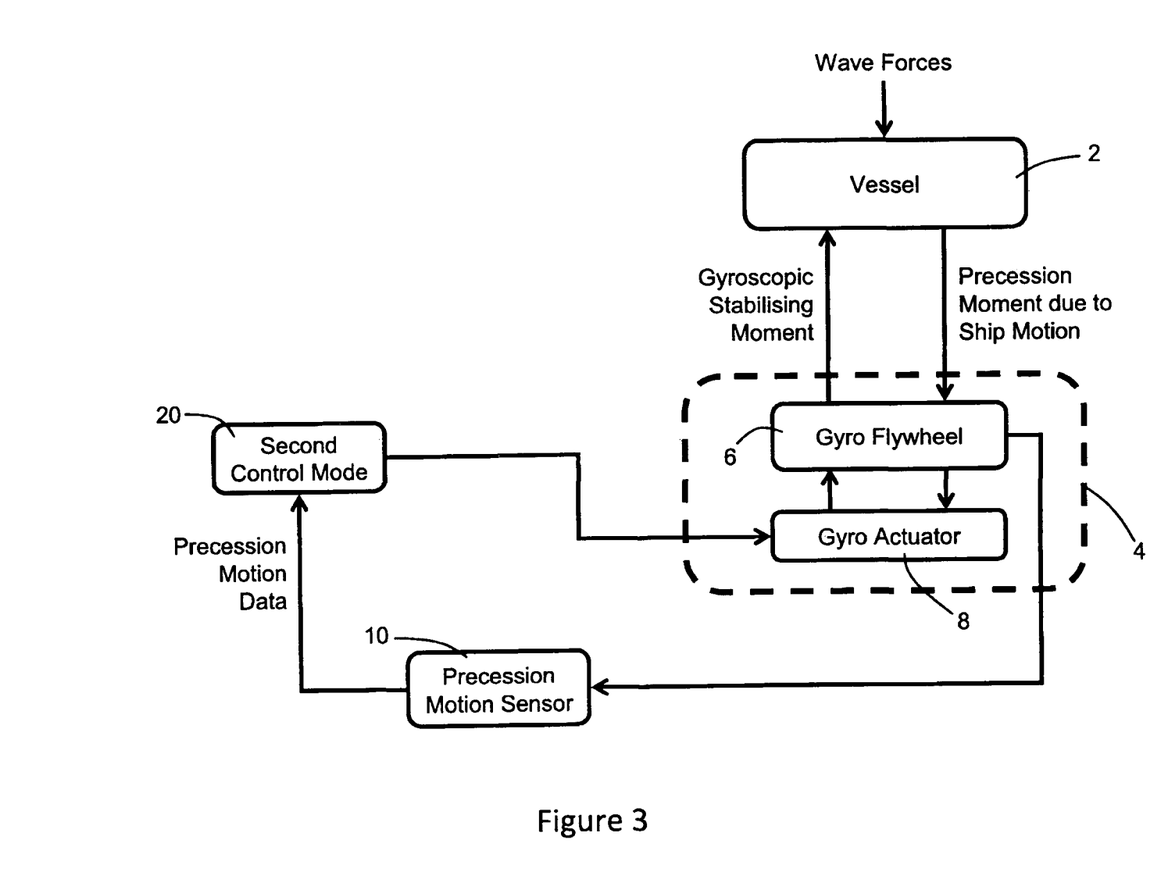
FIG. 3 is a schematic view of the control system of FIG. 1 when operating in a second control mode.

FIG. 3 illustrates the second control mode 22 of the vessel stabiliser control system 12 where the control system receives only gyrostabiliser precession motion signals from the sensor 10. This second control mode 22 can also provide an active control of the gyrostabiliser precession motion despite the vessel roll motion sensor signal being unavailable.

Alternatively, the second control mode 22 can use the signal from the precession motion sensor 10 and/or its derivatives to calculate precession axis driving or resistance control commands for the gyro-actuator 8 using either predictive or reactive control methods, with or without adaptive capability.

The second control mode 22 of FIG. 3 can be, for example, an adaptive control mode using the signal from the precession motion sensor 10 and its derivatives. One example of such an adaptive control which generates a control signal to control the damping of the gyro-actuator 8 to provide a precession control torque to the gyrostabiliser is the AGC controller of the Applicant's co-pending International Application No PCT/AU2011/000168, details of which are incorporated herein by reference. The AGC controller gradually reduces the precession damping to increase the precession axis motion until it is sensed that the precession angle or rate will exceed a predefined limit, at which point the damping is increased to prevent over-precession.

In FIG. 3, the vessel motion sensor signal is not present, so only the precession motion sensor signal is available. Conversely, the precession motion sensor signal can be lost and only the vessel motion sensor signal is available (not illustrated). In this case the precession motion can be estimated from the vessel motion sensor signal and/or its derivatives to generate an estimated precession motion sensor signal to substitute for the lost actual precession motion sensor signal. This estimated, substitute signal can be used to enable operation of according to a first control mode 20. Alternatively, however, the estimated precession motion sensor signal can be substituted for the actual measured precession motion sensor signal present in FIG. 3. This permits many of various types of second control mode 22 to be used effectively when precession motion sensor signal is unavailable but the vessel motion sensor signal is present.

Multiple second control modes 22 can be included in the vessel stabiliser control system 12. As with the first control mode 20, an operator input or other input can be provided to permit the second control mode algorithm to be adjusted or even alternate control methods or algorithms selected, for example to suit the sea state or change the power consumption of the stabiliser system. The or one of the second control mode(s) 22 can also control additional stabilising devices such as flume tanks or moveable ballast.

Figure 4:
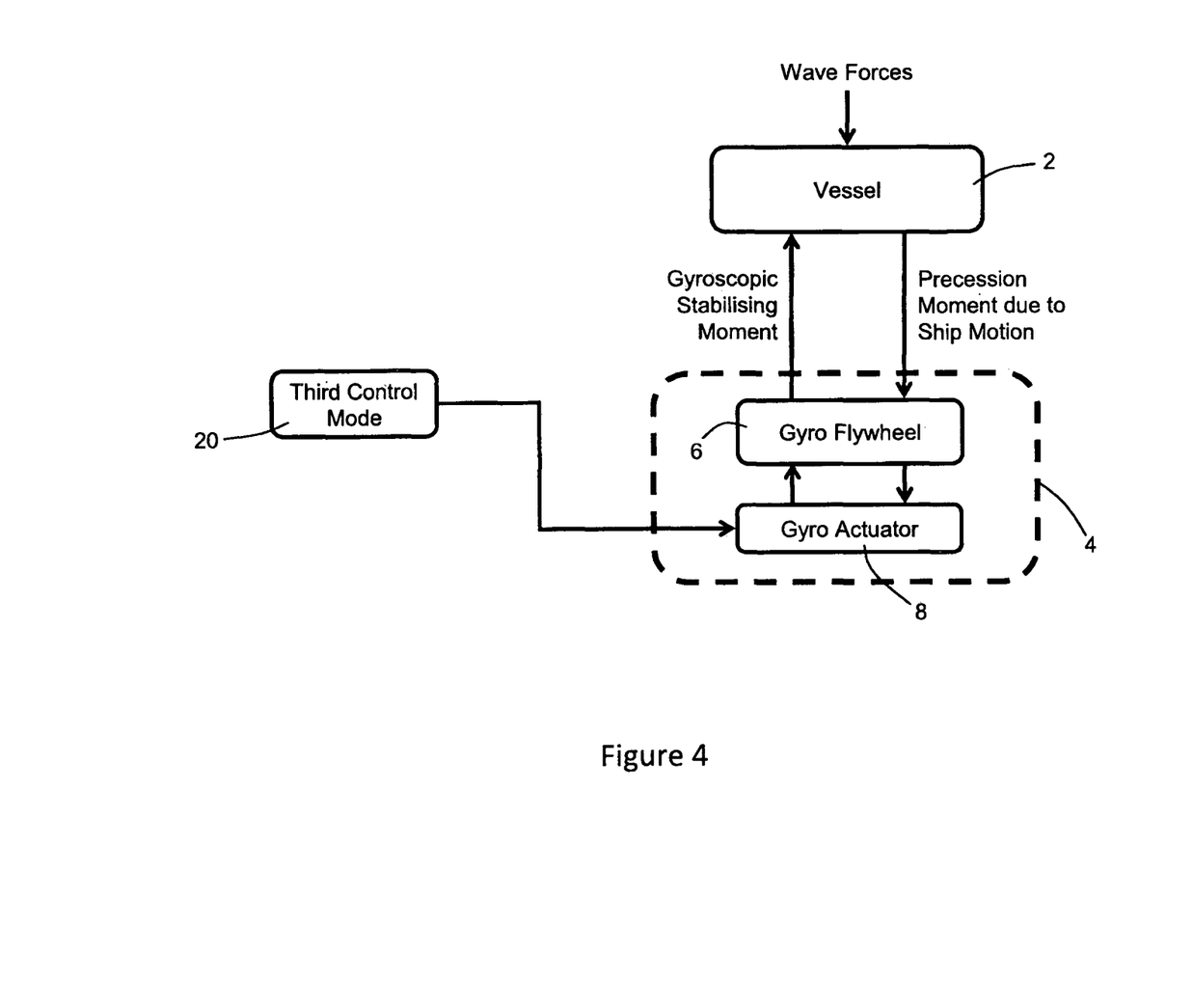
FIG. 4 is a schematic view of the control system of FIG. 1 when operating in a third control mode.

FIG. 4 shows the third control mode 24 of the vessel stabiliser control system 12 where neither the vessel motion sensor nor the precession axis motion sensor signals are available. The third control mode 24 is therefore a passive or manually operated control mode. For example, in the third control mode 24 the control signal for the gyro-actuator 8 can be a pre-set fixed value gain to provide a predetermined precession damping. Such a passive control provides low performance because the fixed level of precession axis braking or damping must be conservatively set to limit precession angles and/or forces within a predefined range in a maximum design sea state or expected range of operating conditions. The passive control mode will not therefore provide adequate performance in low sea states because it does not adapt or vary the precession torque directly. To overcome this limitation, potentially at the risk of not limiting over-precession, a manual adjustment of the damping level can be provided to permit the gyrostabiliser 4 to provide adequate or at least improved performance in low sea states. Where additional stabilising devices are provided, the third control mode 24 can include locking the additional stabilising device or preferably placing it in a default or disabled state.

Figure 5:
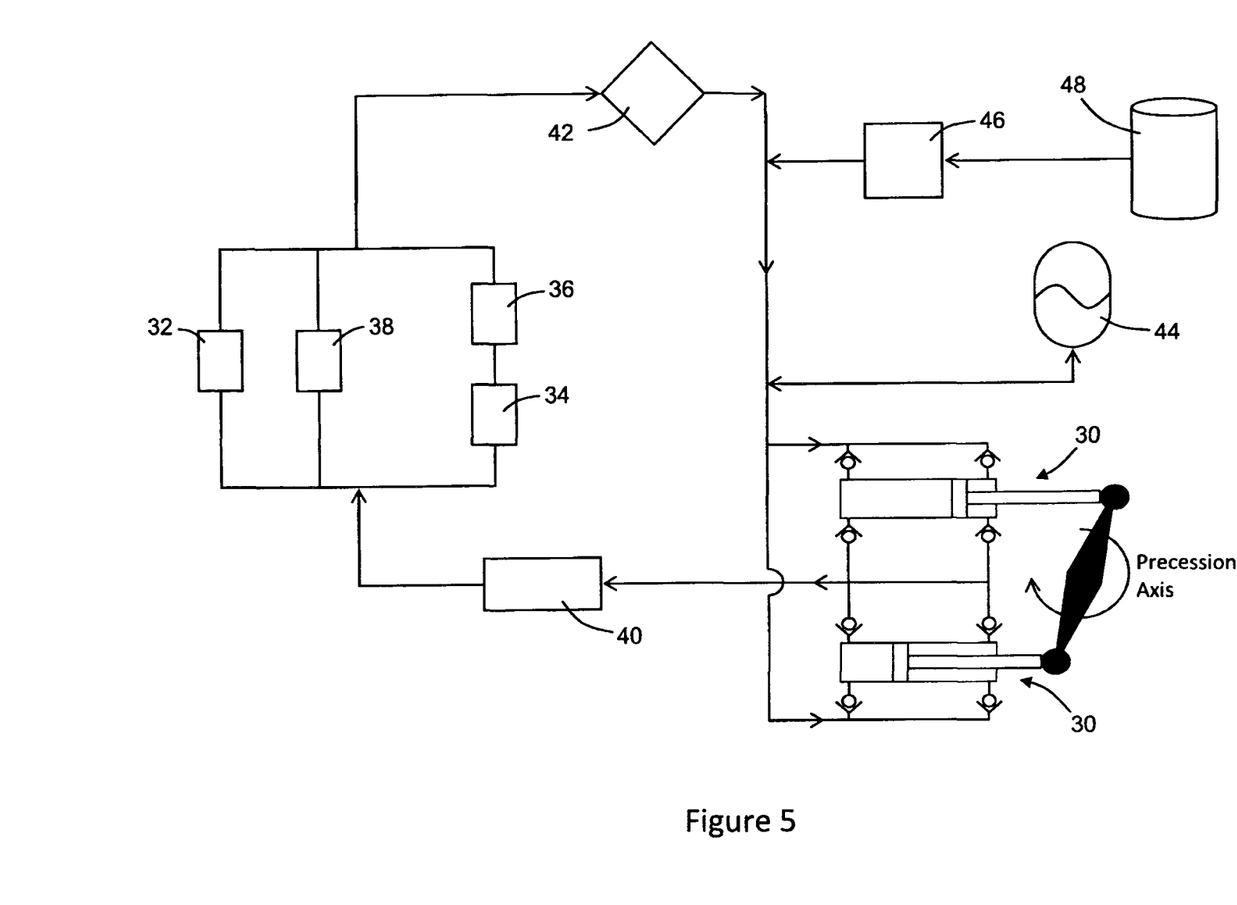
FIG. 5 is a fluid circuit diagram of a preferred embodiment of a gyrostabiliser hydraulic control circuit providing damping control of the precession axis; and, FIG. 6 is a fluid circuit diagram of a preferred embodiment of a gyrostabiliser hydraulic control circuit providing driven control of the precession axis.

FIG. 5 is a simplified circuit diagram of one possible hydraulic control circuit to provide precession axis braking or damping torque for a gyrostabiliser 4. In this case, the gyro-actuator 8 is provided by two hydraulic cylinders 30 in the hydraulic control circuit. The hydraulic control circuit is designed such that the hydraulic cylinders 30 pump fluid around a circuit in the direction indicated by the arrows. An electronically controlled proportional (or servo) flow control valve 32, which is normally closed (when not energised), is located in-line. In normal operation the hydraulic oil is pumped across the proportional flow control valve 32, which restricts oil flow to create a variable resistance to precession. During normal operation of the gyrostabiliser 4 the proportional control valve 32 will be energised open by an amount determined by the control algorithms. By varying the flow settings on the valve 32, the flow is damped. The proportional flow control valve 32 is controlled by a dedicated amplifier.

As a fail-safe measure, if power is removed from the control system (or if the system is in an error state), the proportional control valve 32 closes preventing flow across it. At the same time an electronically activated directional flow control valve (on/off) 34 opens to allow the oil to flow across a manually adjustable pressure compensated proportional flow control valve 36. The directional flow control valve 34 is connected in series with the manually adjustable proportional flow control valve 36, and both are connected in-line parallel to the electronically controlled proportional flow control valve 32. The directional control valve 34 is normally open (when not energised). To maintain this valve closed for normal gyrostabiliser operation, a solenoid coil is required to be energised with, for example, a 24 VDC supply at 0.9 amps.

A manually set pressure relief valve 38 is also provided in-line, parallel to the electronically controlled proportional flow control valve 32, to ensure that the pressure drop across the control valves does not exceed the hydraulic system design pressure. The set-point of this pressure relief valve effectively caps the precession control torque that is applied to the precession axis. A pressure filter 40 removes impurities from the hydraulic fluid in the circuit. If required, an hydraulic fluid heat exchanger 42 and an hydraulic fluid pressure accumulator 44 may be provided. In addition, an optional manual hydraulic fluid pump system 46, with inbuilt filtering, may be connected to a hydraulic control fluid storage device 48, to allow initial hydraulic system filling and system fluid refill or replacement as required.

Figure 6:
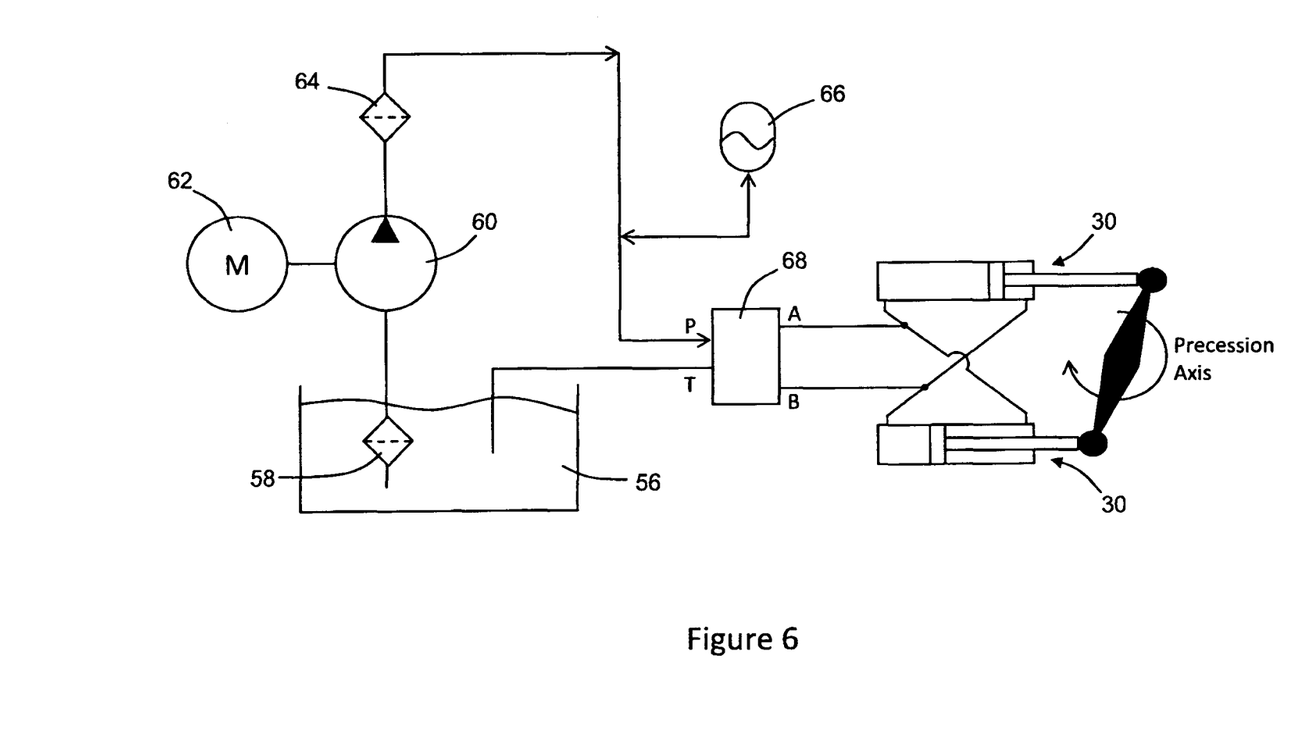

To provide a hydraulic system to drive precession axis motion, a control manifold can be used to switch from the damping hydraulic control circuit of FIG. 5 to a driving hydraulic control circuit shown in FIG. 6. In FIG. 6, the hydraulic cylinders 30 are cross-connected (in a quadrant back and forth) in a driving control hydraulic circuit similar to that used, for example, in ship steering and fin stabiliser actuation. Hydraulic fluid is drawn from hydraulic fluid tank 56 through suction filter 58 by a fixed or variable flow rate hydraulic pump 60 driven by the motor 62. The fluid is passed through the pressure filter 64 into an hydraulic pressure accumulator 66 to provide a supply of high pressure fluid for control. A proportional directional control valve 68 connects the supply of high pressure fluid at port P to either the A port to actuate the cross-connected hydraulic cylinders 30 to drive the precession axis in one direction, or the B port to actuate the cross-connected hydraulic cylinders 30 to drive the precession axis in the opposite direction. When one of the ports A or B of the proportional directional control valve 68 is connected to one chamber in each hydraulic cylinder 30, the other chamber of each cylinder is connected to the port T to return fluid to the tank 56 and permit the hydraulic cylinders 30 to extend and contract.

The hydraulic control circuit for precession damping control, (for example of FIG. 5) and the hydraulic control circuit for precession driving control, (for example of FIG. 6) can both be built into a single hydraulic manifold.

Throughout this specification, when the angle of precession or roll is measured it is implied that the derivatives of this signal then become available for use as process control variables, as differentiating the angle signal is a simple task for a processor in the control system.

Now that preferred embodiments of the vessel stabiliser control system and method have been described in detail, it will be apparent that the described embodiments provide a number of advantages over the prior art, including the following:

(i) By providing fault sensing of process control variables or sensors, and using the sensed number of available process control variables to activate a tiered system of control modes, it is possible to ensure safe and effective operation of the vessel stabiliser that is tolerant of sensor faults and loss of power supply.

(ii) Different levels of control performance can be provided for the stabiliser depending on available resources and sea state.

(iii) By combining two or more of the control modes improved fault-tolerance can be achieved.

It will be readily apparent to persons skilled in the relevant arts that various modifications and improvements may be made to the foregoing embodiments, in addition to those already described, without departing from the basic inventive concepts of the present invention. Therefore, it will be appreciated that the scope of the invention is not limited to the specific embodiments described and is to be determined from the appended claims.

The invention claimed is:

1. A stabiliser control method for stabilising marine vessel motion induced by excitation wave forces, the method comprising the steps of: detecting the availability or otherwise of a precession motion sensor signal and the availability or otherwise of a vessel roll motion sensor signal; selecting a first control mode when both the sensor signals are available; selecting a second control mode when only one of the sensor signals is available; and, selecting a third control mode when both sensor signals are unavailable, and using the selected first, second or third control mode in controlling the stabiliser.

2. A stabiliser control method as defined in claim 1, wherein the precession motion sensor signal is obtained by sensing the precession of a gyrostabiliser employed in a vessel stabilising system for stabilising the vessel.

3. A stabiliser control method as defined in claim 2, wherein the first control mode involves active control of the precession of the gyrostabiliser using both sensor signals and/or derivatives of the sensor signals as process control variables by either driving the precession or actively resisting the roll induced free precession of a flywheel to produce a desired precession motion.

4. A stabiliser control method as defined in claim 2, wherein the second control mode involves active control of the precession of the gyrostabiliser using either the gyrostabiliser precession motion sensor signal or the vessel roll motion sensor signal and/or derivatives of the signal as a process control variable by either driving the precession or actively damping the roll induced free precession of a flywheel to produce a desired precession motion.

5. A stabiliser control method as defined in claim 2, wherein the second control mode includes the step of: calculating appropriate precession axis driving or damping control commands using either predictive or reactive control methods with or without adaptive capability, based on the gyrostabiliser precession motion sensor signal and/or its calculated derivatives.

6. A stabiliser control method as defined in claim 2, wherein the second control mode includes the steps of: estimating the precession motion from the vessel roll motion sensor signal;
and calculating appropriate precession axis driving or damping control commands using either predictive or reactive control methods with or without adaptive capability, based on the estimated precession motion and/or its calculated derivatives.

7. A stabiliser control method as defined in claim 2, wherein the second control mode employs an adaptive control method including the steps of: generating a control signal aimed at increasing the precession of a gyrostabiliser flywheel until it is estimated, based on a process control variable derived from the gyrostabiliser precession axis motion, that the gyrostabiliser precession axis motion will exceed a predefined limit; and, applying a precession control torque about the gyrostabiliser precession axis responsive to the control signal whereby, in use, active adaptive control of the vessel motion can be achieved based only on the process control variable derived from the gyrostabiliser precession axis motion.

8. A stabiliser control method as defined in claim 2, wherein when the gyrostabiliser precession motion sensor signal is unavailable, the vessel roll motion sensor signal and/or its derivatives may be used to generate an estimated precession signal corresponding to an estimate of the gyrostabiliser precession axis motion, the estimated precession signal being substituted for the gyrostabiliser precession motion sensor signal in the second control mode.

9. A stabiliser control method as defined in claim 2, wherein the third control mode provides passive control of the precession of the gyrostabiliser by applying a preset level of braking or damping to the precession axis designed to limit precession angles to within a predefined limit in up to a maximum design sea state over the expected range of operating conditions.

10. A stabiliser control method as defined in claim 9, wherein the preset level of braking or damping applied to the precession axis is manually adjustable.

11. A stabiliser control method as defined in claim 2, wherein the vessel control stabilising system includes an additional vessel stabilising device.

12. A stabiliser control method as defined in claim 11, wherein the first control mode includes the step of controlling the additional stabilising device simultaneously with the control of the gyrostabiliser and/or as allocated by a force allocation system.

13. A stabiliser control method as defined in claim 11, wherein the second control mode includes the step of controlling the additional stabilising device.

14. A stabiliser control method as defined in claim 11, wherein the third control mode includes the step of placing the additional stabilising device in a default or disabled state.

15. A stabiliser control method as defined in claim 11, including the further steps of sensing the availability of the gyrostabiliser and of any additional stabilising devices and modifying a force allocation to suit the loss of availability, or a reduction in performance of one or more of the stabilising devices.

16. A stabiliser control system for stabilising marine vessel motion induced by excitation wave forces, the system comprising: fault detecting means for detecting the availability or otherwise of a precession motion sensor signal and the availability or otherwise of a vessel roll motion sensor signal; control mode selecting means for selecting a first control mode when both the sensor signals are available, selecting a second control mode when only one of the sensor signals is available, and selecting a third control mode when both sensor signals are unavailable; and, stabilising control command generating means for generating a stabilising control command in accordance with the selected control mode.

17. A stabiliser control system as defined in claim 16, wherein the precession motion sensor signal is obtained by sensing the precession of a gyrostabiliser employed in a vessel stabilising system for stabilising the vessel.

18. A stabiliser control system as defined in claim 17, wherein the stabilising control command generated in the first control mode provides active control of the precession of the gyrostabiliser using both sensor signals and/or derivatives of the sensor signals as process control variables by either driving the precession or actively resisting the roll induced free precession of a flywheel to produce a desired precession motion.

19. A stabiliser control system as defined in claim 17, wherein the stabilising control command generated in the second control mode provides active control of the precession of the gyrostabiliser using either the gyrostabiliser precession motion sensor signal or the vessel roll motion sensor signal and/or derivatives of the signal as a process control variable by either driving the precession or actively damping the roll induced free precession of a flywheel to produce a desired precession motion.

20. A stabiliser control system as defined in claim 17, wherein the stabilising control command generating means comprises: means for calculating appropriate precession axis driving or damping control commands in the second control mode using either predictive or reactive control methods with or without adaptive capability, based on the gyrostabiliser precession motion sensor signal and/or its calculated derivatives.

21. A stabiliser control system as defined in claim 17, wherein the stabilising control command generating means comprises: means for estimating the precession motion from the vessel roll motion sensor signal in the second control mode; and means for calculating appropriate precession axis driving or damping control commands using either predictive or reactive control methods with or without adaptive capability, based on the estimated precession motion and/or its calculated derivatives.

22. A stabiliser control method as defined in claim 7, wherein when the gyrostabiliser precession motion sensor signal is unavailable, the vessel roll motion sensor signal and/or its derivatives may be used to generate an estimated precession signal corresponding to an estimate of the gyrostabiliser precession axis motion, the estimated precession signal being substituted for the gyrostabiliser precession motion sensor signal in the second control mode.

23. A stabilizer control method as defined in claim 1, whereby, in use, the most appropriate of the first, second and third control modes is selected to provide control of the stabiliser dependent upon the availability of the precession motion sensor signal and/or the vessel roll motion sensor signal.

24. A stabilizer control system as defined in claim 16, whereby, in use, the most appropriate of the first, second and third control modes is selected to provide vessel stabilisation dependent upon the availability of the precession motion sensor signal and/or the vessel roll motion sensor signal.

* * * * *